No. 624,356. Patented May 2, 1899.
A. LURIE & L. BILOON.
TOASTING AND BROILING APPARATUS.
(Application filed Jan. 3, 1899.)
(No Model.)
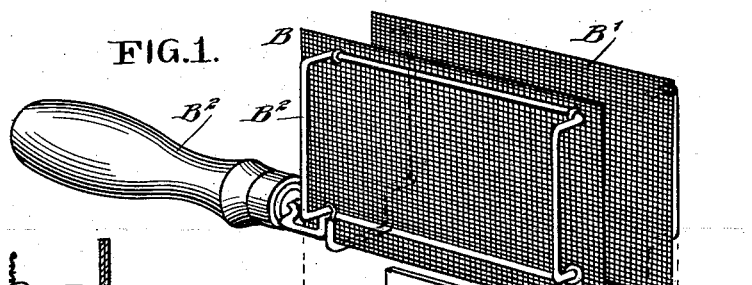
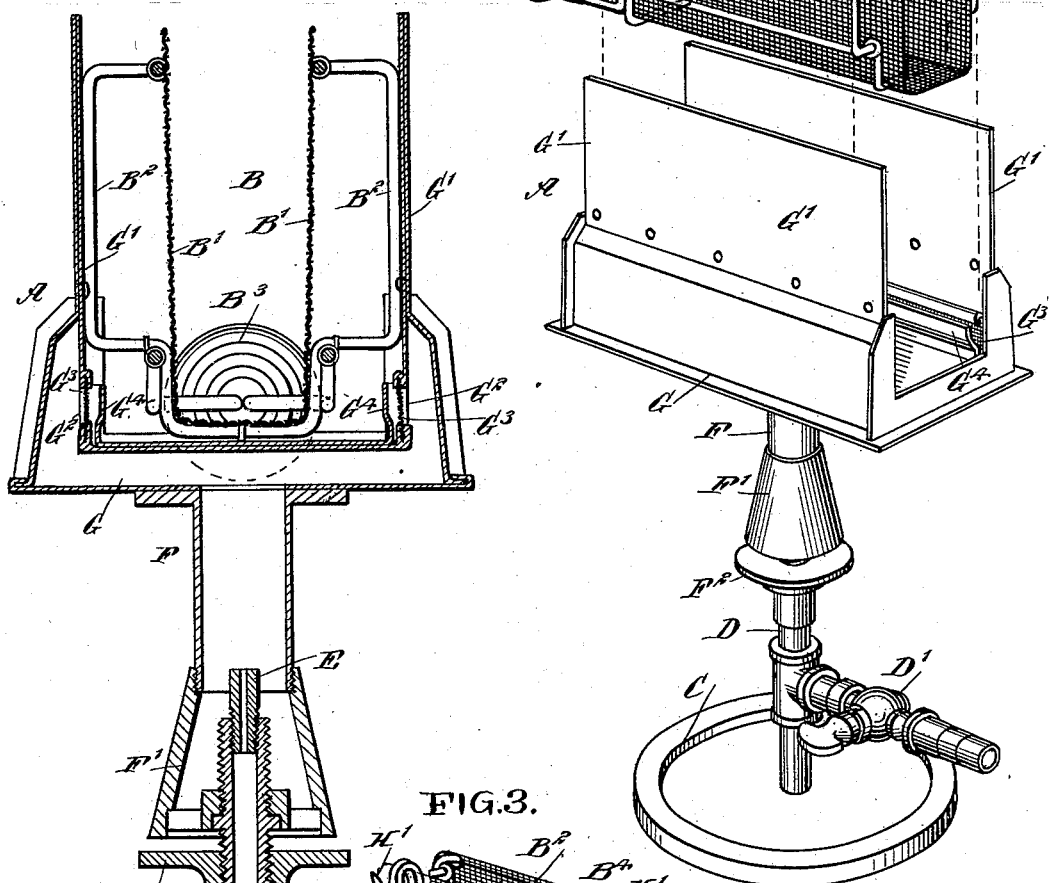
WITNESSES:
INVENTORS
Abraham Lurie.
Louis Biloon.
BY
ATTORNEYS.

UNITED STATES PATENT OFFICE.

ABRAHAM LURIE AND LOUIS BILOON, OF NEW YORK, N. Y.

TOASTING AND BROILING APPARATUS.

SPECIFICATION forming part of Letters Patent No. 624,356, dated May 2, 1899.

Application filed January 3, 1899. Serial No. 700,979. (No model.)

*To all whom it may concern:*

Be it known that we, ABRAHAM LURIE and LOUIS BILOON, of the city of New York, borough of Manhattan, in the county and State of New York, have invented a new and Improved Toasting and Broiling Apparatus, of which the following is a full, clear, and exact description.

The object of the invention is to provide a new and improved toasting and broiling apparatus which is simple and durable in construction and arranged to permit of conveniently and quickly toasting bread and broiling meats.

The invention consists of novel features and parts and combinations of the same, as will be fully described hereinafter and then pointed out in the claims.

A practical embodiment of our invention is represented in the accompanying drawings, forming a part of this specification, in which similar characters of reference indicate corresponding parts in all the views.

Figure 1 is a perspective view of the improvement with the holder shown detached from the burner. Fig. 2 is an enlarged cross-section of the improvement with the holder in position on the burner; and Fig. 3 is a perspective view of a modified form of the improvement, part being broken out.

The improved toaster consists principally of a burner A and a holder B for supporting the bread or meat to be treated. The burner A is mounted on a suitably-constructed base C, carrying a gas-pipe D, the lower portion of which acts as a post set in the base, and said pipe is provided with a valved inlet D', adapted to be connected by a tube with a suitable gas-supply.

In the upper end of the pipe D is arranged a tip E, which delivers the gas into a tube F, provided at its lower end with an air-inlet F' in the form of a truncated cone and attached at its spider to the pipe D, near the upper end thereof. A regulating-valve screws on said pipe to regulate the amount of air passing into the lower end of the air-inlet F', the air in reaching the tube F mixing with the gas, so as to form a mixture of air and gas which passes into a chamber G, set in or attached to the upper end of the tube F.

The chamber G is made approximately U-shaped in cross-section, with the inner sides G' of the vertical members formed with outlet or burner openings $G^2$, extending lengthwise of the sides throughout the length of the chamber, the openings being covered by screens $G^3$ to insure a proper flow of the mixture through the openings against the vertically-disposed deflectors $G^4$, arranged on the inner faces of the sides G' to deflect the flame in an upward direction alongside the inner faces of the sides G', which are preferably extended above the chamber proper, as is plainly indicated in Fig. 2, and reinforced, if necessary.

The holder B is set upon the top of the casing G between the sides G', as is plainly indicated in Fig. 2, and said holder is provided with a wire-netting B', bent into U shape, so as to form a receptacle open at both ends for supporting the bread to be toasted.

The wire-netting B' is supported at the outside on a skeleton frame $B^2$, adapted to fit with its vertical members close upon the sides G' of the chamber G, and on one end of said skeleton frame is secured a handle $B^7$, adapted to be taken hold of by the operator to place the holder in position on the chamber G or to remove it therefrom.

In using the device the operator places the bread to be toasted into the wire-netting casing to extend in a vertical position therein between the vertical members of the casing, and then the operator turns on the gas and ignites the gaseous mixture over the deflectors $G^4$, so that a flame extends vertically in sheet form along the inner faces of the sides G'. The operator now places the holder B in position in the chamber, as indicated in Fig. 2, so that the sheet flame toasts the sides of the bread without danger of the flame coming in direct contact with the bread, owing to its vertical position and the interposition of the sides of the screen-casing B'. As the flame is very intense, it takes but a very short time to properly toast the bread, and when this is done the operator can conveniently lift the holder out of the burner and remove the toasted bread and replace it by a fresh piece to be toasted, and the above-described operation is then repeated.

It is understood that by the arrangement described both sides of the bread are simultaneously and uniformly toasted, and the operator is enabled to readily view the bread, so as to remove the holder, with the bread, as soon as the latter is properly toasted.

The construction illustrated in Fig. 3 comprises a burner and a holder arranged for supporting two pieces of bread at one time or meat to be broiled; but in this case only one side of the bread or meat is toasted or broiled at one time. The burner is provided with a chamber $G^5$, having screen-covered outlets $G^6$ and deflectors the same as those above described in reference to Fig. 2; but the flame extends up along the outside faces of the sides of the chamber, and the latter is straddled by the screen-casing $B^2$ of a burner $B^4$ and is mounted on a frame $B^5$, adapted to carry a removable support H, having hooks H' at the upper end for hanging the meat thereon, the meat extending downward on the outside of the wire-netting and between the outer members $B^6$ and the skeleton frame. The support H is provided at its lower end with an offset $H^2$ for supporting a drip-pan I, adapted to catch the drippings from the broiling meat. While meat is broiling on one side of this device, a piece of bread may be toasted on the other side, the bread being placed in the outer members $B^6$ of the skeleton frame. When the bread is toasted on one side, it has to be removed and reversed to bring the untoasted side next to the wire-netting of the burner.

The casing $G^5$ is mounted on a gas or air supply in the manner above described in reference to Figs. 1 and 2.

Having thus fully described our invention, we claim as new and desire to secure by Letters Patent—

1. A toasting and broiling apparatus, comprising a burner having opposite screen-covered openings for the passage of the flame-producing material, a deflector-plate extended along each opening, and whereby the flame is directed in sheets along the burner side, and a holder for material to be treated, removably supported by the burner and consisting of opposite walls of wire-netting, and a skeleton frame to which the walls are rigidly attached, substantially as specified.

2. A toasting and broiling apparatus, comprising a burner consisting of a casing provided with screened openings in its opposite inner walls, deflectors extended adjacent to said openings, a holder consisting of wire-netting side walls and bottom, and a skeleton frame to which the holder is attached, the said frame being adapted to engage closely between upwardly-extended side walls of the burner, substantially as specified.

3. A toasting and broiling apparatus, comprising a burner, a holder of wire-netting removably supported on the burner, a skeleton frame to which the netting is attached, hooks formed at the upper portion of said frame, and a drip-pan removably supported on the frame, substantially as specified.

ABRAHAM LURIE.
LOUIS BILOON.

Witnesses:
THEO. G. HOSTER,
EVERARD BOLTON MARSHALL.